US012309871B2

(12) United States Patent
Hong

(10) Patent No.: US 12,309,871 B2
(45) Date of Patent: May 20, 2025

(54) METHOD AND DEVICE FOR REPORTING CSI IN SIDELINK COMMUNICATION

(71) Applicants: HYUNDAI MOTOR COMPANY, Seoul (KR); KIA CORPORATION, Seoul (KR)

(72) Inventor: Ui Hyun Hong, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/781,638

(22) Filed: Jun. 1, 2022

(65) Prior Publication Data

US 2024/0430974 A1     Dec. 26, 2024

Related U.S. Application Data

(63) Continuation-in-part of application No. PCT/KR2022/003997, filed on Mar. 22, 2022.

(60) Provisional application No. 63/165,096, filed on Mar. 23, 2021.

(30) Foreign Application Priority Data

Mar. 22, 2022   (KR) .................. 10-2022-0035451

(51) Int. Cl.
   *H04W 76/28*   (2018.01)
   *H04B 7/06*    (2006.01)
   *H04W 24/10*   (2009.01)

(52) U.S. Cl.
   CPC .......... *H04W 76/28* (2018.02); *H04B 7/0626* (2013.01); *H04W 24/10* (2013.01)

(58) Field of Classification Search
   CPC ..... H04W 76/28; H04W 24/10; H04B 7/0626

USPC .......................................................... 370/329
See application file for complete search history.

(56) References Cited

U.S. PATENT DOCUMENTS

| | | | |
|---|---|---|---|
| 9,565,083 B2 * | 2/2017 | Belanger | H04L 43/08 |
| 10,645,730 B2 * | 5/2020 | Cao | H04W 76/27 |
| 10,680,758 B2 * | 6/2020 | Bae | H04L 1/189 |
| 10,721,036 B2 * | 7/2020 | Yi | H04W 72/0446 |
| 10,956,880 B2 * | 3/2021 | Towle | H04L 67/10 |
| 11,038,629 B2 * | 6/2021 | Park | H04L 1/1812 |

(Continued)

FOREIGN PATENT DOCUMENTS

| EP | 4280708 A1 * | 11/2023 | ........... H04L 1/1851 |
|---|---|---|---|
| WO | WO2020256462 A1 | 12/2020 | |

(Continued)

OTHER PUBLICATIONS

Lenovo, Motorola Mobility, "Discussion on wake-up time alignment between Tx and Rx UEs" R2-2101117, 3GPP TSG-RAN WG2 Meeting #113 electronic, Online, Jan. 25-Feb. 5, 2021, pp. 1-4.

(Continued)

*Primary Examiner* — Melvin H Pollack
(74) *Attorney, Agent, or Firm* — Morgan, Lewis & Bockius LLP

(57) ABSTRACT

A method of a first user equipment (UE) may include receiving, from a base station, discontinuous reception (DRX) configuration information; transmitting, to a second UE, sidelink control information (SCI) including information requesting a channel state information (CSI) report; and receiving, from the second UE, the CSI report in an on-duration period based on the DRX configuration information.

20 Claims, 5 Drawing Sheets

(56) References Cited

U.S. PATENT DOCUMENTS

| | | | |
|---|---|---|---|
| 11,323,223 B2* | 5/2022 | Lyu | H04L 5/006 |
| 11,330,087 B2* | 5/2022 | Wouhaybi | G05B 19/042 |
| 11,388,156 B2* | 7/2022 | Kleeberger | H04L 63/123 |
| 11,622,411 B2* | 4/2023 | Narula | H04W 72/23 370/336 |
| 11,729,440 B2* | 8/2023 | Butler | H04L 65/80 709/224 |
| 11,877,241 B2* | 1/2024 | Lin | H04W 76/28 |
| 11,877,278 B2* | 1/2024 | Park | H04W 4/40 |
| 12,028,293 B2* | 7/2024 | Xu | H04L 1/1671 |
| 12,035,241 B2* | 7/2024 | Islam | H04W 24/10 |
| 12,035,243 B2* | 7/2024 | Park | H04W 76/28 |
| 12,052,621 B2* | 7/2024 | Cui | H04W 36/0069 |
| 12,052,662 B2* | 7/2024 | Kung | H04W 92/18 |
| 12,058,538 B2* | 8/2024 | Tenny | H04W 24/04 |
| 12,058,619 B2* | 8/2024 | You | H04W 52/0232 |
| 12,096,356 B2* | 9/2024 | Iyer | H04L 5/0053 |
| 12,101,766 B2* | 9/2024 | Nimbalker | H04W 72/23 |
| 12,114,322 B2* | 10/2024 | Oviedo | H04L 1/1664 |
| 12,143,933 B2* | 11/2024 | Maleki | H04W 52/0229 |
| 12,146,973 B2* | 11/2024 | Manolakos | G01S 5/0036 |
| 12,150,157 B2* | 11/2024 | Miao | H04W 72/21 |
| 12,150,201 B2* | 11/2024 | Park | H04W 76/28 |
| 2021/0037468 A1 | 2/2021 | Huang et al. | |
| 2022/0417854 A1 | 12/2022 | Park et al. | |
| 2023/0269193 A1* | 8/2023 | Wittenmark | H04L 47/283 370/235 |
| 2023/0269755 A1* | 8/2023 | Kang | H04W 52/0229 370/329 |
| 2023/0397034 A1* | 12/2023 | Ko | H04W 28/02 |
| 2024/0334534 A1* | 10/2024 | Ko | H04W 4/40 |

FOREIGN PATENT DOCUMENTS

| | | |
|---|---|---|
| WO | WO 2021-002723 A1 | 1/2021 |
| WO | WO 2021-034966 A1 | 2/2021 |

OTHER PUBLICATIONS

LG Electronics Inc.," Discussion on Sidelink DRX", R2-2100637, 3GPP TSG-RAN WG2 Meeting #113 electronic, Online, Jan. 25-Feb. 5, 2021, pp. 1-6.

LG Electronics Inc., Discussion on Sidelink DRX, R2-2008943, 3GPP TSG-RAN WG2 Meeting #112 electronic, Online, Nov. 2-Nov. 13, 2020, pp. 1-6.

Moderator (OPPO), R1-2101412, FL Summary for AI 8.11.1.1—Resource Allocation for Power Saving; 3GPP TSG RAN WG1#104-e, e-Meeting, Jan. 25-Feb. 5, 2021.

\* cited by examiner

METHOD AND DEVICE FOR REPORTING CSI IN SIDELINK COMMUNICATION

The present application is a continuation-in-part of International Patent Application No. PCT/KR2022/003997, filed Mar. 22, 2022, which claims priority to Korean Patent Application No. 2022-0035451, filed Mar. 22, 2022 and U.S. Provisional Patent Application No. 63/165,096, filed Mar. 23, 2021, the entire contents of which are incorporated herein for all purposes by these references.

BACKGROUND OF THE PRESENT DISCLOSURE

Field of the Present Disclosure

The present disclosure relates to a sidelink communication technique, and more particularly, to a technique for reporting channel state information (CSI) in consideration of discontinuous reception (DRX) operations.

Description of Related Art

A fifth-generation (5G) communication system (e.g., New Radio (NR) communication system) which utilizes a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-Vehicle to Everything (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels. Sidelink communication may be performed using configured grant (CG) resources. The CG resources may be periodically configured, and periodic data (e.g., periodic sidelink data) may be transmitted using the CG resources.

Meanwhile, in the sidelink communication, a first terminal may transmit a channel state information (CSI) request to a second terminal, and the second terminal may transmit a CSI report including a measurement result of a CSI-reference signal (CSI-RS). The sidelink communication may support a discontinuous reception (DRX) operation, and the first terminal may operate in a wake-up state or a sleep state based on a DRX cycle. In the instant case, a CSI reporting method in consideration of the DRX operation is required.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method and an apparatus of reporting CSI in consideration of DRX operations in sidelink communication.

A method of a first user equipment (UE), according to a first exemplary embodiment of the present disclosure for achieving the objective, may include: receiving, from a base station, discontinuous reception (DRX) configuration information; transmitting, to a second UE, sidelink control information (SCI) including information requesting a channel state information (CSI) report; and receiving, from the second UE, the CSI report in an on-duration period based on the DRX configuration information.

The on-duration period may be maintained until the CSI report is received.

The method may further include receiving, from the base station, information indicating a latency time between the requesting of the CSI report and the receiving of the CSI report, wherein the on-duration period is maintained during the latency time.

The method may further include receiving, from the base station, an indicator indicating enabling of an operation of maintaining the on-duration period, wherein when the indicator is received, the on-duration period is maintained.

The transmitting of the SCI to the second UE may further include: transmitting, to the second UE, a first stage SCI including information indicating a second stage SCI including information for requesting the CSI report; and transmitting, to the second UE, the second stage SCI associated with the first stage SCI, wherein the second stage SCI further includes the DRX configuration information applied to the first UE.

The second stage SCI may further include an indicator indicating enabling of an operation of maintaining the on-duration period.

The SCI may further include an indicator indicating enabling of an operation of maintaining the on-duration period.

A method of a second user equipment (UE), according to a second exemplary embodiment of the present disclosure for achieving the objective, may include: receiving, from a first UE, a first stage sidelink control information (SCI); receiving, from the first UE, a second stage SCI associated with the first stage SCI; generating a channel state information (CSI) report when a CSI request field included in the second stage SCI requests the CSI report; and transmitting the CSI report to the first UE in consideration of discontinuous reception (DRX) configuration information applied to the first UE.

The CSI report may be transmitted in an on-duration period based on the DRX configuration information.

The on-duration period based on the DRX configuration information may be expected to be maintained until the CSI report is received from the first UE.

The method may further include receiving, from the base station, information indicating a latency time between the requesting of the CSI report and the transmitting of the CSI report, wherein the CSI report is repeatedly transmitted in a plurality of on-duration periods based on the DRX configuration information existing within a period corresponding to the latency time.

An indicator indicating enabling of an operation of maintaining an on-duration period based on the DRX configuration information may be included in the second stage SCI received from the first UE or a higher layer message received from the base station, and when the indicator is received, the on-duration period of the first UE may be expected to be maintained.

The DRX configuration information may be included in the second stage SCI received from the first UE or a higher layer message received from the base station.

A first user equipment (UE), according to a third exemplary embodiment of the present disclosure for achieving the objective, may include: a processor; and a memory storing one or more instructions executable by the processor, wherein when executed by the processor, the one or more instructions are executed to: receive, from a base station, discontinuous reception (DRX) configuration information; transmit, to a second UE, sidelink control information (SCI) including information requesting a channel state information (CSI) report; and receive, from the second UE, the CSI report in an on-duration period based on the DRX configuration information.

The on-duration period may be maintained until the CSI report is received.

The one or more instructions may be further executed to receive, from the base station, information indicating a latency time between the requesting of the CSI report and the receiving of the CSI report, wherein the on-duration period may be maintained during the latency time.

The one or more instructions may be further executed to receive, from the base station, an indicator indicating enabling of an operation of maintaining the on-duration period, wherein when the indicator is received, the on-duration period may be maintained.

In the transmitting of the SCI to the second UE, the one or more instructions may be further executed to: transmit, to the second UE, a first stage SCI including information indicating a second stage SCI including information for requesting the CSI report; and transmit, to the second UE, the second stage SCI associated with the first stage SCI, wherein the second stage SCI may further include the DRX configuration information applied to the first UE.

The second stage SCI may further include an indicator indicating enabling of an operation of maintaining the on-duration period.

The SCI may further include an indicator indicating enabling of an operation of maintaining the on-duration period.

According to an exemplary embodiment of the present disclosure, a first terminal may perform a DRX operation and may transmit a request for a CSI report to a second terminal. The first terminal may maintain an on-duration period according to the DRX operation to receive the CSI report. Furthermore, the second terminal may transmit the CSI report to the first terminal in consideration of the on-duration period of the first terminal. Accordingly, even when the DRX operation is performed in sidelink communication, a CSI reporting procedure may be efficiently performed, and the performance of the communication system may be improved.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
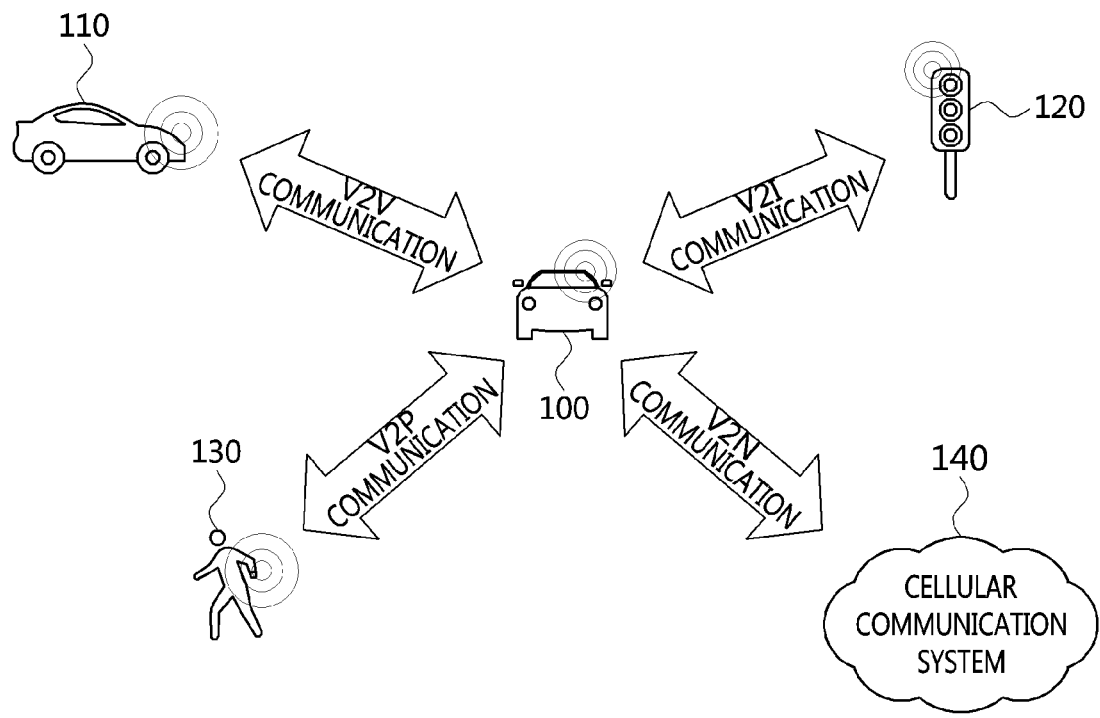
FIG. 1 is a conceptual diagram illustrating V2X communication scenarios.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

While the present disclosure is susceptible to various modifications and alternative forms, specific embodiments are shown by way of example in the drawings and described in detail. It should be understood, however, that the description is not intended to limit the present disclosure to the specific embodiments, but, on the other hand, the present disclosure is to cover all modifications, equivalents, and alternatives that fall within the spirit and scope of the present disclosure.

Although the terms "first," "second," etc. may be used herein in reference to various elements, such elements should not be construed as limited by these terms. These terms are only used to distinguish one element from another.

For example, a first element could be termed a second element, and a second element could be termed a first element, without departing from the scope of the present disclosure. The term "and/or" includes any and all combinations of one or more of the associated listed items.

In exemplary embodiments of the present disclosure, "at least one of A and B" may mean "at least one of A or B" or "at least one of combinations of one or more of A and B". Also, in exemplary embodiments of the present disclosure, "one or more of A and B" may mean "one or more of A or B" or "one or more of combinations of one or more of A and B".

In exemplary embodiments of the present disclosure, "(re)transmission" may mean "transmission", "retransmission", or "transmission and retransmission", "(re)configuration" may mean "configuration", "reconfiguration", or "configuration and reconfiguration", "(re)connection" may mean "connection", "reconnection", or "connection and reconnection", and "(re)access" may mean "access", "re-access", or "access and re-access".

It will be understood that when an element is referred to as being "connected" or "coupled" to another element, it may be directly connected or coupled to the other element or intervening elements may be present. In contrast, when an element is referred to as being "directly connected" or "directed coupled" to another element, there are no intervening elements.

The terminology used herein is for describing particular embodiments only and is not intended to be limiting of embodiments of the present disclosure. As used herein, the singular forms "a," "an," and "the" are intended to include the plural forms as well, unless the context clearly indicates otherwise. It will be further understood that the terms "includes," "including," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which an exemplary embodiment of the present disclosure pertains. It will be further understood that terms defined in commonly used dictionaries may be interpreted as having a meaning which is consistent with their meaning in the context of the related art and will not be interpreted in an idealized or overly formal sense unless expressly so defined herein.

Hereinafter, exemplary embodiments of the present disclosure will be described in detail with reference to the accompanying drawings. In describing the present disclosure, to facilitate the entire understanding, like numbers refer to like elements throughout the description of the figures and the repetitive description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In the instant case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In the instant case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In the instant case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
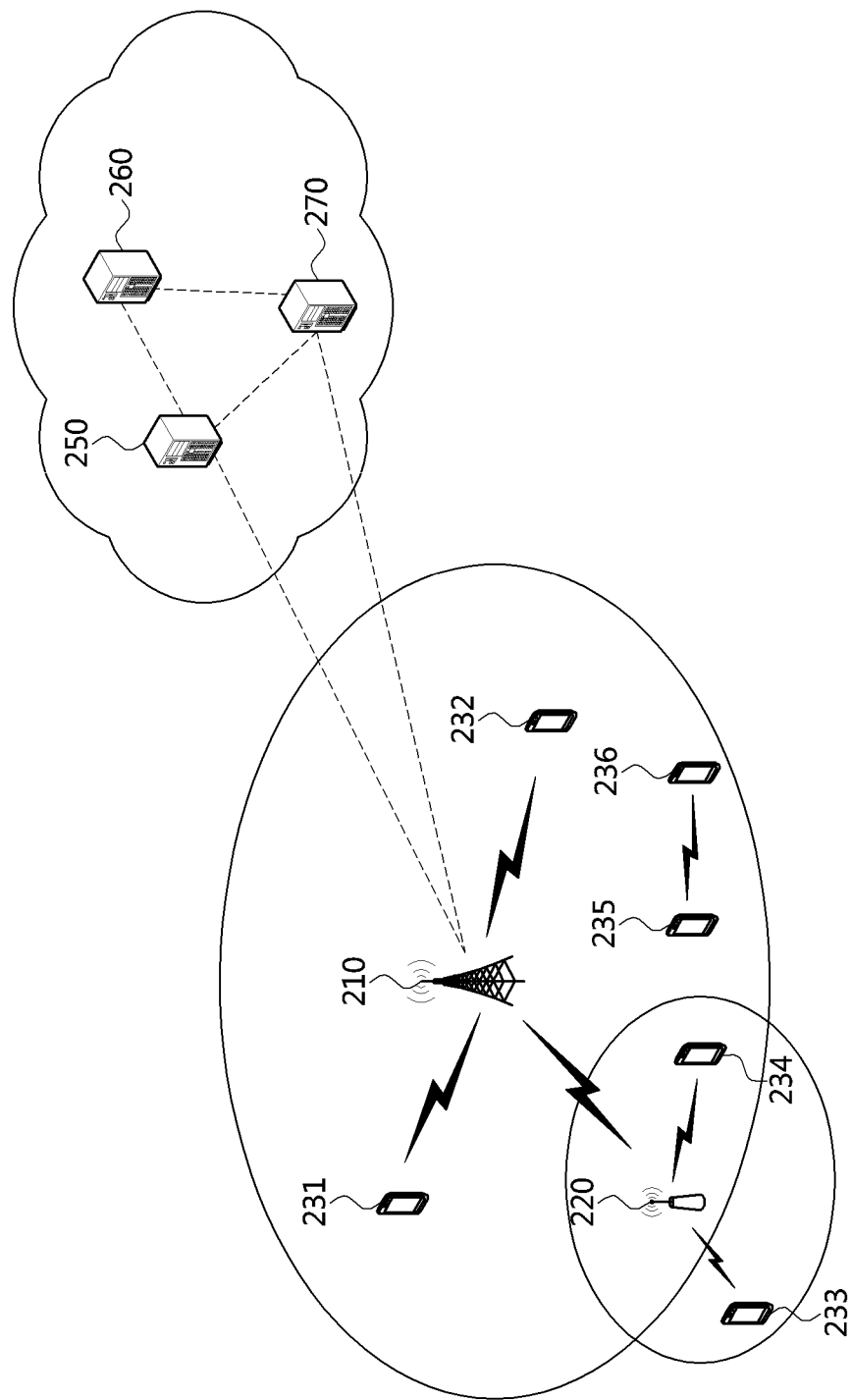
FIG. 2 is a conceptual diagram illustrating an exemplary embodiment of a cellular communication system.

FIG. 2 is a conceptual diagram illustrating an exemplary embodiment of a cellular communication system.

As shown in FIG. 2, a cellular communication system may include an access network, a core network, and the like. The access network may include a base station 210, a relay 220, User Equipments (UEs) 231, 232, 233, 234, 235 and 236, and the like. The UEs 231, 232, 233, 234, 235 and 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

Furthermore, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) including the cellular communication system may perform communications by use of at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) including the cellular communication system may be configured as follows.

Figure 3:
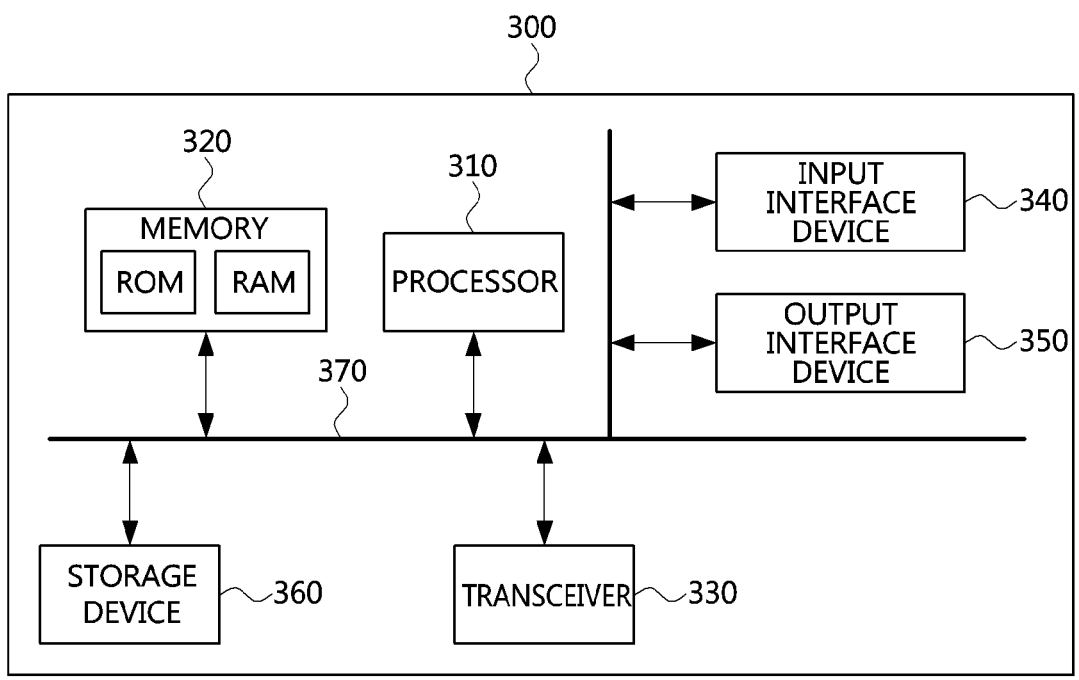
FIG. 3 is a conceptual diagram illustrating an exemplary embodiment of a communication node forming a cellular communication system.

FIG. 3 is a conceptual diagram illustrating an exemplary embodiment of a communication node forming a cellular communication system.

As shown in FIG. 3, a communication node 300 may include at least one processor 310, a memory 320, and a transceiver 330 connected to a network for performing communications. Also, the communication node 300 may further include an input interface device 340, an output interface device 350, a non-transitory storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may include at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231, 232, 233, 234, 235 and 236 and the relay 220, and may transmit signals received from the UEs 231, 232, 233, 234, 235 and 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231, 232, 233, 234, 235 and 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
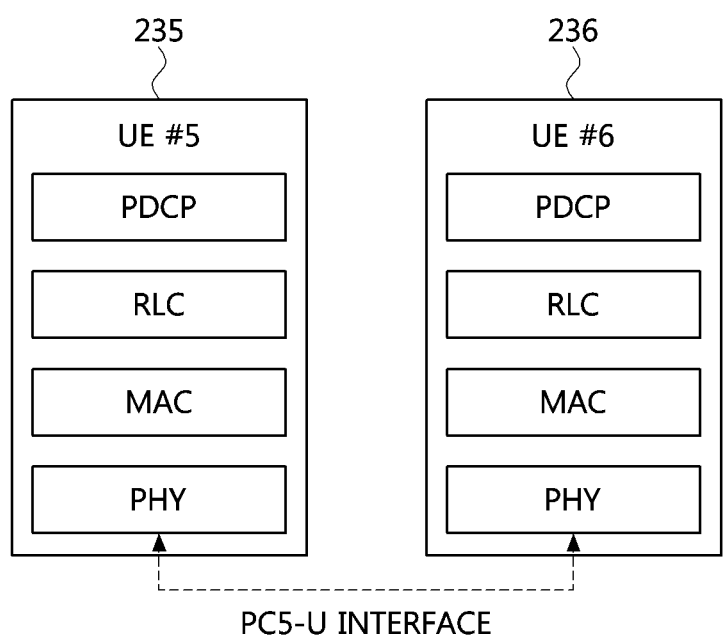
FIG. 4 is a block diagram illustrating an exemplary embodiment of a user plane protocol stack of a UE performing sidelink communication.

FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may include a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications, and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
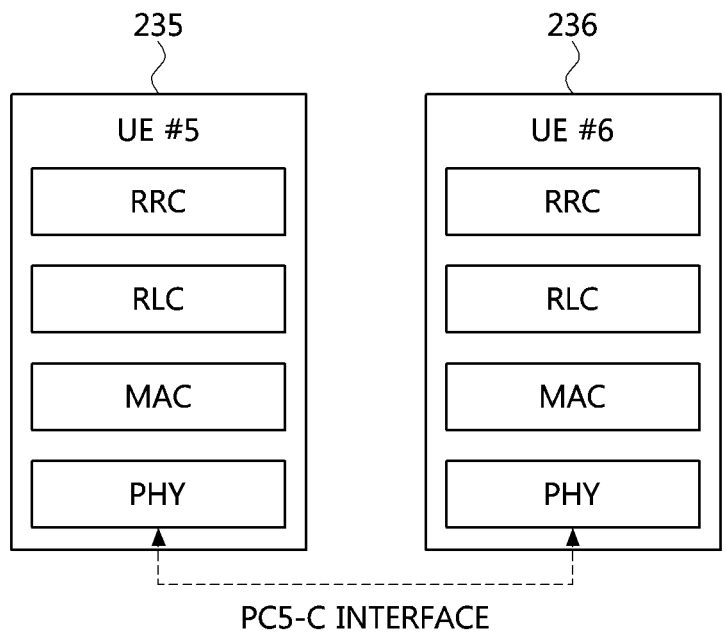
FIG. 5 is a block diagram illustrating a first exemplary embodiment of a control plane protocol stack of a UE performing sidelink communication.
Figure 6:
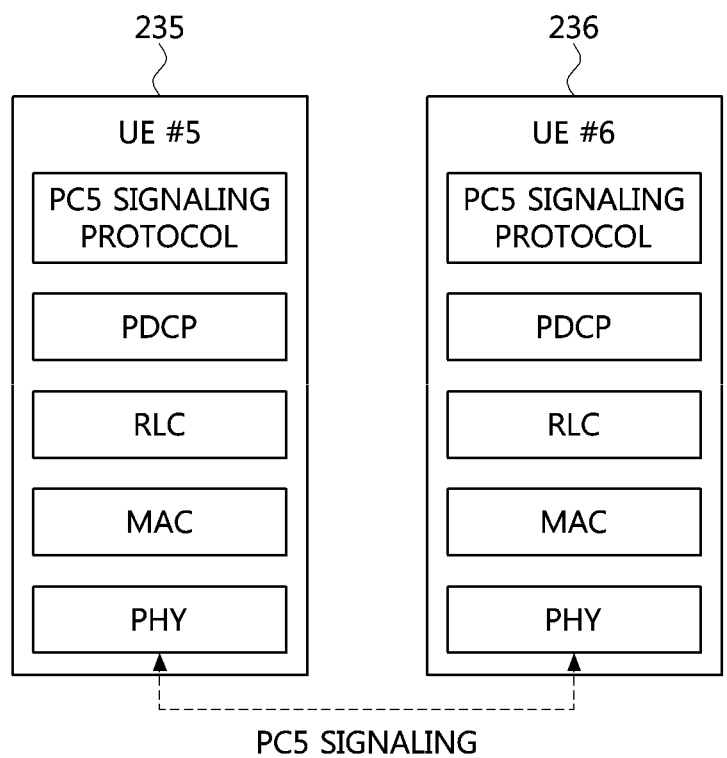
FIG. 6 is a block diagram illustrating a second exemplary embodiment of a control plane protocol stack of a UE performing sidelink communication.

FIG. 5 is a block diagram illustrating a first exemplary embodiments of a control plane protocol stack of a UE performing sidelink communication, and FIG. 6 is a block diagram illustrating a second exemplary embodiments of a control plane protocol stack of a UE performing sidelink communication.

As shown in FIG. 5 and FIG. 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In the instant case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In the instant case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In the instant case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In the instant case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, sidelink communication methods will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

In exemplary embodiments of the present disclosure, signaling may be one or a combination of two or more of higher layer signaling, MAC signaling, and physical (PHY) signaling. A message used for higher layer signaling may be referred to as a 'higher layer message' or 'higher layer signaling message'. A message used for MAC signaling may be referred to as a 'MAC message' or 'MAC signaling message'. A message used for PHY signaling may be referred to as a 'PHY message' or 'PHY signaling message'. The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), or SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell-specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. Furthermore, a sidelink channel may refer to a sidelink channel including a sidelink signal mapped to specific resources in the corresponding sidelink channel. The sidelink communication may support a broadcast service, a multicast service, a groupcast service, and a unicast service.

The sidelink communication may be performed based on a single-SCI scheme or a multi-SCI scheme. When the single-SCI scheme is used, data transmission (e.g., sidelink data transmission, sidelink-shared channel (SL-SCH) transmission) may be performed based on one SCI (e.g., 1st-stage SCI). When the multi-SCI scheme is used, data transmission may be performed using two SCIs (e.g., 1st-stage SCI and 2nd-stage SCI). The SCI(s) may be transmitted on a PSCCH and/or a PSSCH. When the single-SCI scheme is used, the SCI (e.g., 1st-stage SCI) may be transmitted on a PSCCH. When the multi-SCI scheme is used, the 1st-stage SCI may be transmitted on a PSCCH, and the 2nd-stage SCI may be transmitted on the PSCCH or a PSSCH. The 1st-stage SCI may be referred to as 'first-stage SCI', and the 2nd-stage SCI may be referred to as 'second-stage SCI'. A first stage SCI format may include an SCI format 1-A, and a second stage SCI format may include an SCI format 2-A, an SCI format 2-B, and an SCI format 2-C.

The 1st-stage SCI may include or more information elements among priority information, frequency resource assignment information, time resource assignment information, resource reservation period information, demodulation reference signal (DMRS) pattern information, 2nd-stage SCI format information, a beta_offset indicator, the number of DMRS ports, and modulation and coding scheme (MCS) information. The 2nd-stage SCI may include one or more information elements among a HARQ processor identifier (ID), a redundancy version (RV), a source ID, a destination ID, CSI request information, a zone ID, and communication range requirements. The SCI format 2-C may be used for decoding of a PSSCH and/or providing inter-UE coordination information.

In exemplary embodiments of the present disclosure, "an operation (e.g., transmission operation) is configured" may mean "configuration information (e.g., information element(s), parameter(s), etc.) for the operation" and/or "information indicating performing of the operation" is signaled. "information element(s) (e.g., parameter(s)) are configured" may mean that the information element(s) are signaled. The signaling may be at least one of system information (SI) signaling (e.g., transmission of a system information block (SIB) and/or master information block (MIB)), RRC signaling (e.g., transmission of RRC parameter(s) and/or higher layer parameter(s)), MAC control element (CE) signaling, PHY signaling (e.g., transmission of downlink control information (DCI), uplink control information (UCI), and/or sidelink control information (SCI)), or a combination thereof. Here, the MAC CE signaling operation may be performed through a data channel, the PHY signaling operation may be performed through a control channel or a data channel, and the transmission of the SCI may refer to transmission of a first stage SCI and/or a second stage SCI.

Meanwhile, a terminal may consider a power saving operation in a resource allocation procedure. For example, the terminal may perform a discontinuous reception (DRX) operation. In exemplary embodiments of the present disclosure, the DRX operation may refer to a DRX operation in a Uu link between the terminal and a base station and/or a DRX operation in a sidelink (SL) between terminals. The terminal may operate in a wake-up state (e.g., ON state) in an on-duration period within a DRX cycle. The DRX cycle may be a cycle of the on-duration period. The terminal may perform communications (e.g., sidelink communications, reception operations) in the on-duration period, and may operate in a sleep state (e.g., idle state, inactive state, OFF state) in a period (e.g., off-duration period) other than the on-duration period. When the DRX operation is performed in sidelink communication, power consumption of the terminal may be reduced.

In sidelink communication supporting the DRX operation, a channel state information (CSI) reporting procedure may be performed. For example, a first terminal may transmit a CSI request to a second terminal. The second terminal may receive the CSI request from the first terminal, and may transmit a CSI report to the first terminal based on the CSI request. The first terminal may receive the CSI report from the second terminal. The CSI report may include a measurement result (e.g., channel quality indicator (CQI)) based on a CSI-reference signal (CSI-RS). The first terminal transmitting the CSI request may be referred to as a 'CSI-triggering UE or UE-A', and the second terminal transmitting the CSI report may be referred to as a 'UE-B'.

The first terminal performing the DRX operation may receive the CSI report from the second terminal within an on-duration period according within a DRX cycle. To receive the CSI report within the on-duration period, the first terminal may maintain the on-duration period. Alternatively, to receive the CSI report, the first terminal may maintain a wake-up state. When the operating state of the first terminal does not transition from the wake-up state to the sleep state, power consumption of the first terminal may increase. In the sidelink communication, DRX configuration may be configured in consideration of the CSI reporting procedure.

Figure 7:
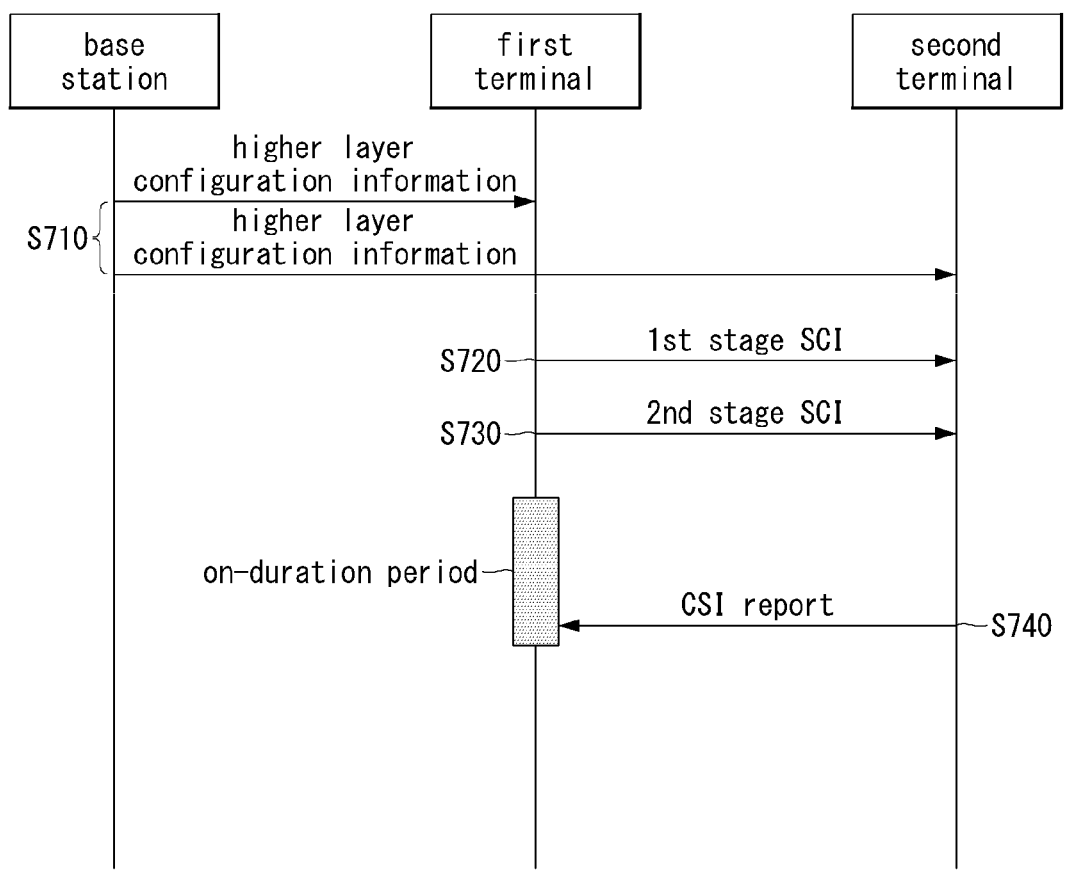
FIG. 7 is a sequence chart illustrating a first exemplary embodiment of a CSI reporting method in sidelink communication.

FIG. 7 is a sequence chart illustrating a first exemplary embodiments of a CSI reporting method in sidelink communication.

As shown in FIG. 7, a communication system may include a base station, a first terminal, and a second terminal. The base station may transmit higher layer configuration information to one or more terminals (e.g., the first terminal and/or the second terminal) (S710). The higher layer configuration information may include DRX configuration information and/or CSI configuration information, and each of the DRX configuration information and CSI configuration information may include information element(s) defined in Table 3 below.

TABLE 3

|  | Information elements |
| --- | --- |
| DRX configuration information | DRX cycle information |
|  | On-duration period information |
|  | Off-duration period information |
| CSI configuration information | CSI-RS information |
|  | CSI request information |
|  | CSI report information |

The DRX configuration information may be DRX configuration information applied to a Uu link between the base station and the first terminal and/or DRX configuration information applied to a sidelink between the terminals. The DRX configuration information may be applied to the first terminal. Alternatively, the DRX configuration information may be applied to both the first terminal and the second terminal. The CSI configuration information may be used for a CSI reporting procedure between the first terminal and the second terminal. The CSI configuration information (e.g., CSI report information) may include sl-LatencyBoundCSI-Report. sl-LatencyBoundCSI-Report may indicate a latency boundary of CSI reporting. For example, sl-LatencyBound-CSI-Report may indicate a delay time (e.g., maximum delay time) between a CSI request and a CSI report associated with the CSI request. sl-LatencyBoundCSI-Report may be configured in units of slots.

The first terminal and/or the second terminal may receive the higher layer configuration information from the base station, and may identify the information element(s) included in the higher layer configuration information. The first terminal and/or the second terminal may perform DRX operations based on the DRX configuration information.

The first terminal may transmit an SCI to the second terminal to trigger a CSI report. For example, the first terminal may transmit a first stage SCI to the second terminal (S720). The first stage SCI may have the SCI format 1-A. The SCI format 1-A may include a second stage SCI format field, and a value of the second stage SCI format field may be set to '00'. The second stage SCI format field set to '00' may indicate that a format of the second stage SCI associated with the SCI format 1-A is the SCI format 2-A. The format of the second stage SCI may be indicated according to a value of the second stage SCI format field as shown in Table 4 or Table 5 below.

TABLE 4

| Second stage SCI format field value | Second stage SCI format |
| --- | --- |
| 00 | SCI format 2-A |
| 01 | SCI format 2-B |
| 10 | SCI format 2-C |
| 11 | reserved |

TABLE 5

| Second stage SCI format field value | Second stage SCI format |
| --- | --- |
| 00 | SCI format 2-A |
| 01 | SCI format 2-B |
| 10 | SCI format 2-C |
| 11 | SCI format 2-D |

The first terminal may transmit the second stage SCI (e.g., SCI format 2-A) associated with the first stage SCI (e.g., SCI format 1-A) to the second terminal (S730). The SCI format 2-A may include information element(s) defined in Table 6 below.

TABLE 6

Information elements
HARQ process number
New data indicator (NDI)
Redundancy version (RV)
Source ID
Destination ID
HARQ feedback enable/disable indicator
Cast type indicator
CSI request The CSI request (e.g., CSI request field) may be set to a first value (e.g., 0) or a second value (e.g., 1). The CSI request set to the first value may indicate that transmission of a CSI report is not requested, and the CSI request set to the second value may indicate that transmission of a CSI report is requested. In the step S730, the CSI request field included in the second stage SCI (e.g., SCI format 2-A) may indicate that transmission of a CSI report is requested.

Alternatively, a new SCI format may be transmitted instead of the SCI format 2-A in the step S730. The new SCI format may be the SCI format 2-C defined in Tables 4 and 5 or the SCI format 2-D defined in Table 5. In the instant case, the value of the second stage SCI format field included in the first stage SCI transmitted in the step S720 may be set to '10' or '11'. The new SCI format may include the CSI request field. Furthermore, the new SCI format may further include DRX configuration information (e.g., DRX cycle, on-duration period, and/or off-duration period). The DRX configuration information included in the new SCI format may be used in the CSI reporting procedure. The DRX configuration information included in the new SCI format may be the same as the DRX configuration information received in the step S710. Alternatively, the DRX configuration information included in the new SCI format may be different from the DRX configuration information received in the step S710. In the instant case, the DRX configuration information included in the new SCI format may be interpreted as DRX configuration information reconfigured for the CSI reporting procedure.

The new SCI format may further include power saving (PS) configuration information. The PS configuration information may include information indicating whether the terminal (e.g., the first terminal and/or the second terminal) is a PS terminal and/or information indicating whether a PS operation is performed. The length of the on-duration period indicated by the DRX configuration information may be configured so that the first terminal can receive the CSI report. The on-duration period may be configured in consideration of sl-LatencyBoundCSI-Report.

The second terminal may receive the first stage SCI (e.g., SCI format 1-A) from the first terminal, and may identify the information element(s) included in the first stage SCI. The second terminal may determine that the format of the second stage SCI associated with the first stage SCI is the SCI format 2-A, SCI format 2-C, or SCI format 2-D based on the second stage SCI format field included in the first stage SCI. The second terminal may receive the second stage SCI (e.g., SCI format 2-A, SCI format 2-C, or SCI format 2-D) associated with the first stage SCI from the first terminal, and may identify the information element(s) included in the second stage SCI. The second terminal may determine that transmission of a CSI report is requested based on a value (e.g., the second value) of the CSI request field included in the second stage SCI. Furthermore, the second terminal may obtain the DRX configuration information and/or PS configuration information from the second stage SCI.

The second terminal may receive a CSI-RS from the first terminal, and may generate a CSI report including a measurement result (e.g., CQI) for the CSI-RS. The second terminal may transmit the CSI report to the first terminal (S740). The CSI report may be transmitted on a PSSCH (e.g., a PSSCH scheduled by the SCI format 1-A). The second terminal may transmit the CSI report to the first terminal within a latency boundary indicated by sl-LatencyBoundCSI-Report received in the step S710. When the second terminal knows DRX configuration of the first terminal, the second terminal may transmit the SCI report to the first terminal in on-duration period(s) according to the DRX configuration within a period determined based on sl-LatencyBoundCSI-Report.

The first terminal may not receive the CSI report of the second terminal due to interference from another communication node (e.g., the base station and/or another terminal). To solve the present problem, the second terminal may transmit the CSI report to the first terminal in all on-duration periods within the period determined based on sl-LatencyBoundCSI-Report. In the instant case, the CSI report may be repeatedly transmitted. The on-duration period and/or CSI reporting timing may be associated with sl-PSFCH-Period configured by higher layer signaling. sl-PSFCH-Period may indicate a transmission periodicity of PSFCH. For example, the CSI report may be transmitted/received in a slot in which a PSFCH is configured.

The first terminal may receive the CSI report from the second terminal. When the first terminal performs the DRX operation, the reception operation of the CSI report may be performed in the on-duration period. When the second terminal knows the DRX configuration of the first terminal, the first terminal may perform the reception operation of the CSI report in the on-duration period based on the DRX configuration without maintaining or increasing the on-duration period. As another method, the first terminal performing the DRX operation may maintain the on-duration period (e.g., wake-up state) to receive the CSI report. In the instant case, the on-duration period may be increased. For example, the first terminal may maintain the on-duration period during the period indicated by sl-LatencyBoundCSI-Report. Furthermore, the second terminal may expect that the on-duration period is maintained or increased until the CSI report is received from the first terminal. For example, the second terminal may expect that the on-duration period of the first terminal is maintained or increased during the period indicated by sl-LatencyBoundCSI-Report.

After the step S730 is performed, the first terminal supporting the PS mode (e.g., DRX operation) may not operate in the sleep state, and may maintain the on-duration period to be longer than a length configured by higher layer signaling. According to the above-described operation, the first terminal may complete the reception of the CSI report as soon as possible. "The on-duration period is maintained long" may mean "the on-duration period is configured at the earliest time after the transmission of the CSI request" or "the first terminal operates in the sleep state at the latest time after the transmission of the CSI request".

Enabling or disabling of the operation of maintaining (e.g., increasing) the on-duration period may be indicated by higher layer signaling or PHY signaling (e.g., SCI format 1-A, SCI format 2-A, SCI format 2-C, and/or SCI format 2-D). An indicator (e.g., 1-bit indicator) indicating enabling or disabling of the operation of maintaining the on-duration period (e.g., wake-up state) may be signaled in the step S710. When the operation of maintaining the on-duration period is enabled, the first terminal may maintain the on-duration period to receive the CSI report. Furthermore, when the operation of maintaining the on-duration period is enabled, the second terminal may expect that the on-duration period of the first terminal is maintained or increased. When the operation of maintaining the on-duration period is disabled, the first terminal may operate according to the DRX cycle based on the DRX configuration.

When the CSI reporting procedure is completed within the period determined based on sl-LatencyBoundCSI-Report, the first terminal and/or the second terminal may operate in the sleep state for the remaining time within the above-described period. The on-duration period (e.g., the period in which the first terminal operates in the wake-up state) increased for the reception of the CSI report may be preconfigured in units of slots. The DRX cycle may be configured in units of slots. When the indicator indicating enabling of the operation of maintaining (e.g., increasing) the on-duration period is received, the second terminal may perform an operation of transmitting the CSI report as early as possible.

When a first stage SCI obtained through a sensing operation in a period other than the on-duration period indicates transmission of a second stage SCI (e.g., SCI format 2-A, SCI format 2-C, SCI format 2-D) including a CSI request field, information element(s) included in the first stage SCI and/or the second stage SCI may be utilized in the DRX operation.

The above-described DRX configuration (e.g., DRX cycle) may be applied to terminals performing the CSI report transmission/reception operations. The DRX configuration may be applied differently to terminals performing the CSI report transmission/reception operations and terminals not performing the CSI report transmission/reception operations.

The DRX configuration information and/or CSI configuration information may be configured specifically, independently, or commonly based on at least one of a resource pool, service type, priority, whether power saving operation is performed, QoS parameters (e.g., reliability, latency), cast type, terminal type (e.g., vehicle (V)-UE or pedestrian (P)-UE), or a combination thereof. The above-described configuration may be performed by a network and/or the base station. Alternatively, DRX configuration information and/or CSI configuration information may be implicitly determined based on preconfigured parameter(s).

Whether each method (e.g., each rule) is applied in the above-described exemplary embodiment of the present disclosure may be configured based on at least one of a condition, a combination of conditions, a parameter, or a combination of parameters. Whether to apply each method may be configured by the network and/or the base station. Whether to apply each method may be configured in a resource pool or service-specific manner. Alternatively, whether to apply each method may be configured by PC5-RRC signaling between terminals.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device may be configured to operate as at least one software module to perform the exemplary embodiments of the present disclosure, and vice versa.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for operating a first user equipment (UE), the method comprising:
receiving from a base station, discontinuous reception (DRX) configuration information;

transmitting to a second UE, sidelink control information (SCI) including information requesting a channel state information (CSI) report; and receiving from the second UE, the CSI report in an active time of a DRX that is determined based on the DRX configuration information.

2. The method of claim 1, wherein the active time is maintained until the CSI report is received.

3. The method of claim 1, further including:
receiving information indicating a latency boundary for the CSI report,
wherein the active time is maintained during a period indicated by the latency boundary.

4. The method of claim 1, further including:
receiving from the base station, an indicator indicating enabling of an operation of maintaining the active time,
wherein when the indicator is received, the active time is maintained.

5. The method of claim 1, wherein the transmitting of the SCI to the second UE further includes:
transmitting, to the second UE, a first stage SCI including information indicating a second stage SCI including information for requesting the CSI report; and
transmitting, to the second UE, the second stage SCI associated with the first stage SCI,
wherein the second stage SCI further includes the DRX configuration information applied to the first UE.

6. The method of claim 5, wherein the second stage SCI further includes an indicator indicating enabling of an operation of maintaining the active time.

7. The method of claim 1, wherein the SCI further includes an indicator indicating enabling of an operation of maintaining the active time.

8. A method for operating a second user equipment (UE), the method comprising:
receiving from a first UE, a first stage sidelink control information (SCI);
receiving from the first UE, a second stage SCI associated with the first stage SCI;
generating a channel state information (CSI) report in case that a CSI request field included in the second stage SCI requests the CSI report; and
transmitting to the first UE, the CSI report in consideration of discontinuous reception (DRX) configuration information applied to the first UE.

9. The method of claim 8, wherein the CSI report is transmitted in an active time based on the DRX configuration information.

10. The method of claim 8, wherein the active time based on the DRX configuration information is expected to be maintained until the CSI report is received from the first UE.

11. The method of claim 8, further including:
receiving from the base station, information indicating a latency boundary for the CSI report, wherein the active time is maintained during a period indicated by the latency boundary.

12. The method of claim 8, wherein an indicator indicating:
enabling of an operation of maintaining an active time based on the DRX configuration information is included in the second stage SCI received from the first UE or a higher layer message received from the base station, and when the indicator is received, the active time of the first UE is expected to be maintained.

13. The method of claim 8, wherein the DRX configuration information is included in the second stage SCI received from the first UE or a higher layer message received from the base station.

14. A first user equipment (UE) comprising:
a processor; and
a memory storing one or more instructions executable by the processor,
wherein when executed by the processor, the one or more instructions are executed to:
receive, from a base station, discontinuous reception (DRX) configuration information;
transmit, to a second UE, sidelink control information (SCI) including information requesting a channel state information (CSI) report; and
receive, from the second UE, the CSI report in an active time of a DRX that is determined based on the DRX configuration information.

15. The first UE of claim 14, wherein the active time is maintained until the CSI report is received.

16. The first UE of claim 14, wherein the one or more instructions are further executed to receive, from the base station, information indicating a latency boundary for the CSI report, wherein the active time is maintained during a period indicated by the latency boundary.

17. The first UE of claim 14, wherein the one or more instructions are further executed to receive, from the base station, an indicator indicating enabling of an operation of maintaining the active time, wherein when the indicator is received, the active time is maintained.

18. The first UE of claim 14,
wherein in the transmitting of the SCI to the second UE, the one or more instructions are further executed to:
transmit, to the second UE, a first stage SCI including information indicating a second stage SCI including information for requesting the CSI report; and
transmit, to the second UE 1, the second stage SCI associated with the first stage SCI, and
wherein the second stage SCI further includes the DRX configuration information applied to the first UE.

19. The first UE of claim 18, wherein the second stage SCI further includes an indicator indicating enabling of an operation of maintaining the active time.

20. The first UE of claim 14, wherein the SCI further includes an indicator indicating enabling of an operation of maintaining the active time.

* * * * *